Aug. 9, 1938.　　　E. C. S. CLENCH　　　2,126,310
TRANSMITTER FOR FLUID PRESSURE SYSTEMS
Filed Aug. 29, 1935　　　3 Sheets-Sheet 1
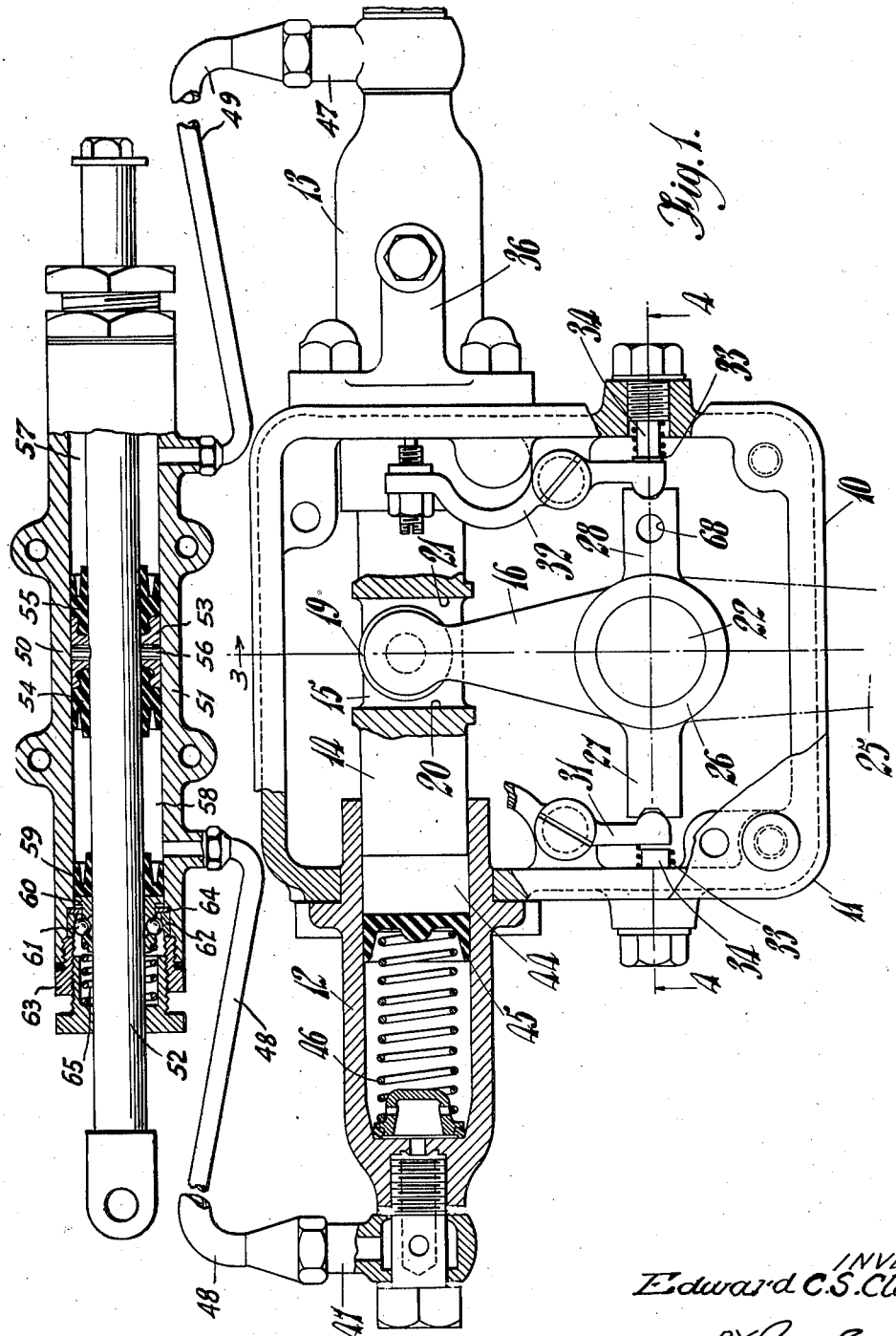
INVENTOR
Edward C. S. Clench
BY
ATTORNEY Aug. 9, 1938.    E. C. S. CLENCH    2,126,310
TRANSMITTER FOR FLUID PRESSURE SYSTEMS
Filed Aug. 29, 1935    3 Sheets-Sheet 2
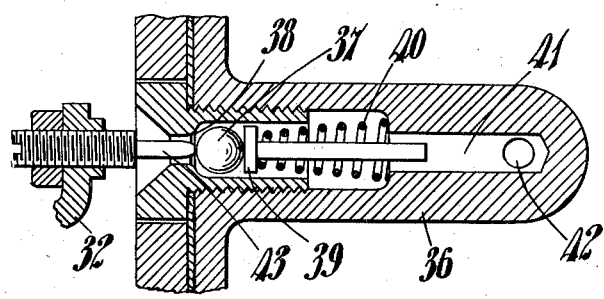
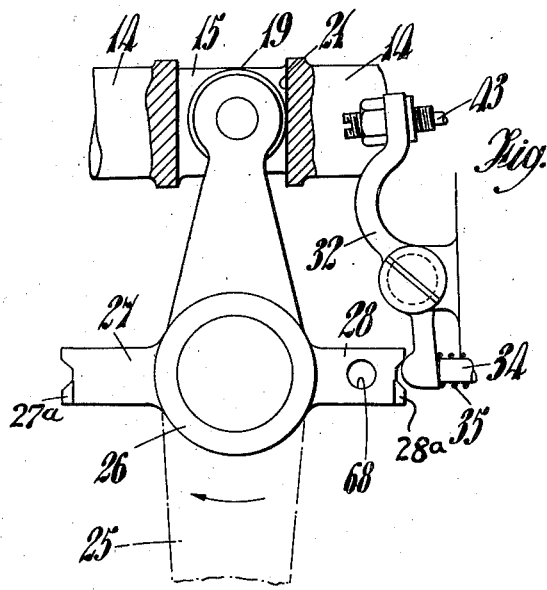
INVENTOR
Edward C. S. Clench
BY
ATTORNEY

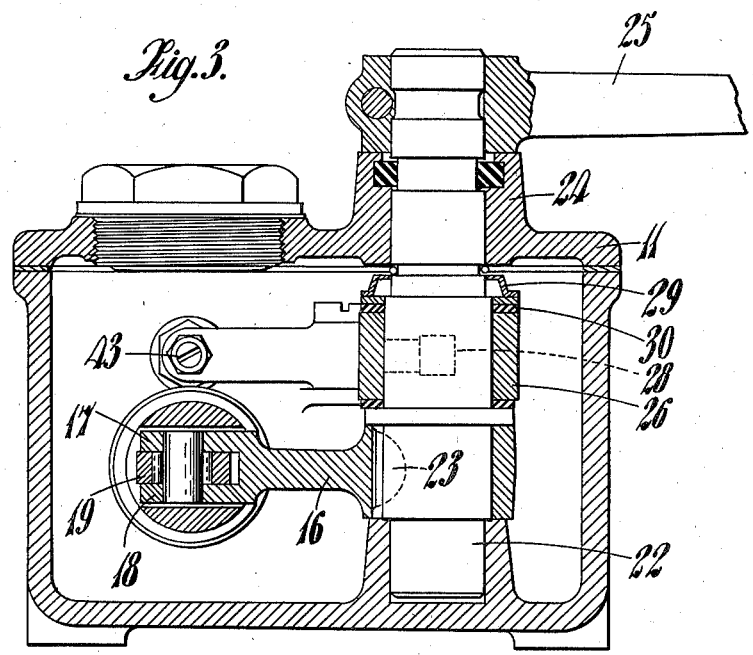
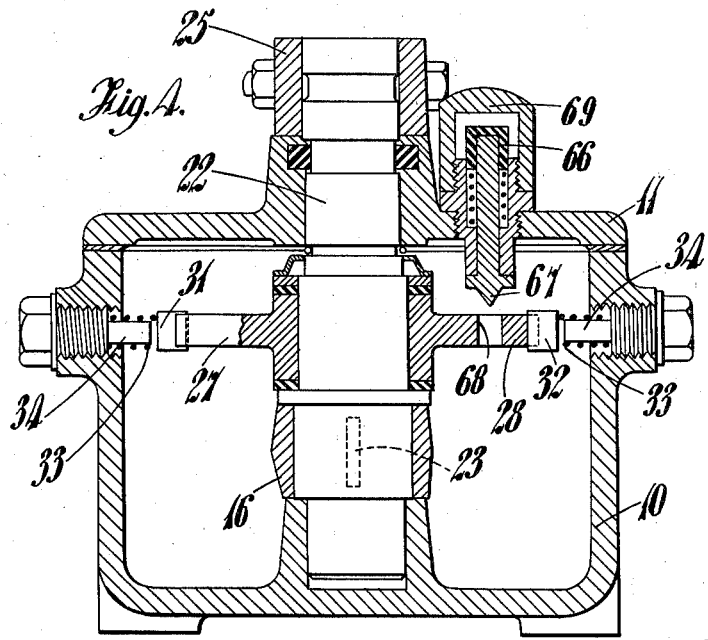

Patented Aug. 9, 1938

2,126,310

UNITED STATES PATENT OFFICE 2,126,310

TRANSMITTER FOR FLUID PRESSURE SYSTEMS

Edward Claude Shakespeare Clench, Leamington Spa, England, assignor to Automotive Products Company Limited, London, England Application August 29, 1935, Serial No. 38,460
In Great Britain September 5, 1934

11 Claims. (Cl. 60—54.6)

This invention relates to fluid pressure control systems, and particularly to those of the hydraulic type in which a master cylinder arrangement herein referred to as the operating element is connected by means of one or more pipe lines with a motor cylinder or operated element whereby movement imparted to the master cylinder part of the system is transferred to the motor cylinder part and is thus used for effecting an operation remotely with respect to the master cylinder.

It is well known that in totally sealed liquid systems, trouble is caused by the expansion of the pressure liquid due to a rise in the temperature thereof, and also by the reduction in volume of such liquid in the system due to the contraction caused by a fall in temperature and/or by leakage due to wear of the working parts. Such increase or diminution of the effectual volume of the liquid in the system will introduce lack of synchronism between the operating and the operated elements, and it is, therefore, the object of the present invention to provide an improved method and means whereby this difficulty is overcome, and at the same time to produce an improved construction of hydraulic controlling apparatus which is capable of wide application.

The invention accordingly provides a method of compensating for temperature changes in a hydraulic controlling system, having an operated element adapted to follow the movements imparted to an operating element by means of liquid pressure in connecting pipe lines, said method consisting in providing a valve arrangement which places the pipe lines automatically into communication with a low pressure reservoir whenever the operating element is inactive, irrespective of the setting of said operating element. In a hydraulic controlling system having an operating element connected by a pipe line with an operated element so that movement of the operating element is transmitted to the operated element, according to a further feature of the invention means are provided which act at all settings of the controlling system for automatically connecting the pipe line to a reservoir except when movement is being, or is about to be, transmitted. The system may conveniently comprise a double acting master cylinder and piston, a double acting piston in a cylinder, pipe lines connecting the respective parts of the slave cylinder to those of the master cylinder, and means whereby the pipe lines are automatically connected with a liquid reservoir whenever the system is inoperative, irrespective of the position of the pistons with regard to their range of movement.

As a further feature the invention provides a hydraulic controlling system comprising an operated element connected by one or more pipe lines with an operating element having a lever, handle, or equivalent controlling member, so that movements of said controlling member are transmitted hydraulically through the pipe line or lines to the operated element, characterized in that initial movement of the controlling member in either direction and at any part of its operative travel isolates the pipe line or lines from a liquid reservoir with which it or they freely communicate whenever the system is inactive, irrespective of the position of the controlling member. Preferably the controlling element or master piston is connected with a controlling member such as a handle by means of a lost motion device, movement of the controlling member to make up this lost motion being arranged to render the system operative by isolating from the liquid reservoir that pipe line at least which is required to transmit pressure liquid for correspondingly moving the operated element. Further, a double acting master cylinder may be provided, the two working spaces of which are connected by independent pipe lines with the corresponding working spaces of a double acting motor cylinder, a common liquid reservoir being associated with the master cylinder and being fitted with a pair of valves which are arranged to be selectively closed by a controlling member serving to actuate the master piston, in accordance with the direction in which the controlling member is moved. Preferably a slipping clutch or other frictional device is incorporated between the controlling member and a valve operating member in order that said controlling member may be enabled to execute its full range of movement, at the same time maintaining the valves in their operative closed condition.

One constructional form of the improved system according to the invention is illustrated in the accompanying drawings in which:—

Figure 1 is a plan partly in section showing the internal construction of a master cylinder unit with a motor cylinder assembly;

Figure 2 is a sectional plan to an enlarged scale showing the construction of one of the automatically controlled valves, said valve being in its normal open position;

Figure 3 is a sectional elevation on the line 4—4 showing the interior of the master cylinder unit;

Figure 4 is a sectional elevation on the line 3—3 of Figure 1; and

Figure 5 is a fragmentary plan showing the action of the controlling member and the valve actuating mechanism.

Referring firstly to the general arrangement as given in Figure 1, it will be seen that the master cylinder unit comprises a substantially rectangular casing 10 having a cover 11 and provided at opposite sides with a pair of master cylinders 12 and 13 disposed in alignment. Slidably mounted within the cylinders 12 and 13 is a common double acting piston member 14 which is slotted diametrally at its centre part as indicated at 15, and shown more clearly in Figure 3, for co-operation with an arm 16 serving to actuate the piston member 14. For this purpose the arm 16 is forked, and is provided between its limbs 17 and 18 with a roller 19 conveniently mounted on roller bearings, the outside diameter of said roller 19 being such that there is considerable clearance between its periphery and the end walls 20 and 21 of the slot 15, the reason for which will be hereinafter explained.

The arm 16 is fixedly mounted upon an operating spindle 22 by means of a key 23, the upper end of said spindle 22 being arranged to project through a bush 24 in the cover 11, and provided with a controlling lever 25 fixedly secured to said spindle 22 by serrations, splines or any other convenient means.

Also mounted on the spindle 22 is a transverse member 26 having a pair of radial arms 27 and 28, which member is frictionally held upon the spindle by means of a spring washer 29 and a pair of friction washers 30, so that normally the transverse member 26 tends to rotate with the spindle 22 so long as it does not meet with excessive resistance. The outer ends of the radial arms 27 and 28 are notched as shown in Figure 1 for cooperation with projections upon a pair of rocker levers 31 and 32, which latter are held in contact with the arms 27 and 28 by means of coiled compression springs 33. Moreover, the levers 31 and 32 are provided each with a stop 34 for limiting their outward movement so that when the controlling lever 25 is moved, for example in a clockwise direction as shown in Figure 5, the first angular movement causes the arms 27 and 28 to displace the levers 31 and 32 respectively until further movement is prevented by the stops 34. During this short movement the roller 19 has come into contact with the end wall 21 of the slot 15 so that further angular movement of the lever 25 serves to actuate the master piston 14. The springs 33 are designed in conjunction with the slope of the notches in the ends of the arms 27 and 28, so that upon release of the lever 25 from external constraint, said lever is returned slightly and the transverse member 26 assumes its neutral position as shown in Figure 1, while the arm 16 also moves to a corresponding amount so that the roller 19 is centralized within the slot 15. This mechanism is provided primarily for effecting the operation of a breathing valve fitted to each of the master cylinders 12 and 13 and enclosed within housings, one of which is indicated at 36. The construction of each of these breathing valves is shown in Figure 2, from which will be seen that a ball 37 is normally urged against a seating 38 by means of a plunger 39 which is acted upon by a spring 40, while the housing 36 is provided with a longitudinal passage 41 and a downward passage 42 communicating with the working space of the corresponding master cylinder. The ball valve 37 is mechanically controlled by means of a push member 43 which is adjustably mounted in the end of the rocking lever 32, a similar arrangement being provided in conjunction with the master cylinder 12 so that when the operating lever is in an unconstrained condition i. e. when the setting of the control is not being altered, both of the valves 37 are held off their seats 38, thus providing free communication between the working spaces of the master cylinders 12 and 13 and the interior of the reservoir 10. When, however, the lever 25 is being moved the rocking levers 31 and 32 automatically allow the valves 37 to seat themselves, thus rendering operative the master cylinders 12 and 13.

The common piston member 14 is slightly enlarged at its ends as indicated at 44 so as to slide smoothly within the master cylinders, and each of said ends is provided with a rubber or other piston cup packing 45 which is held against the end of the piston by means of a low rated spring 46 or in any other suitable manner. The delivery from each of the master cylinders 12 and 13 takes place through banjo connections 47 having pipe connections 48 and 49 respectively, which usually proceed to a remote position where they are connected with the respective ends of a motor cylinder indicated generally at 50.

The form of motor cylinder 50 shown in Figure 1 of the drawings comprises a substantially tubular body 51 having extending co-axially therethrough a rod 52 serving as the operated element and provided with a piston 53 fitted with rubber cups 54 and 55, said piston being held firmly upon the rod 52 by means of a pin 56. Normally when the operating lever 25 is moved, say in a clockwise direction, the two valves 37 first close, and then liquid under pressure is ejected from the master cylinder 13 and passes through the pipe 49 to the right hand working space 57 in the motor cylinder 50, thus moving the rod 52 to the left. This, of course, reduces the capacity of the left hand working space 58 so that the liquid contained therein is returned to the master cylinder 12. It is important, however, that locking means should be provided for the rod 52, so that forces applied thereto, other than operating forces, will not be able to alter the setting of said rod 52, and for this purpose a locking means is provided at each end of the motor cylinder 50. The left hand locking means is shown in section in Figure 1, but it will be understood that the right hand locking means is exactly similar in construction, although it is, of course, adapted to work in the opposite direction. The working space 58 is bounded by an auxiliary cup washer or piston 59 which bears against a sleeve 60 having a circumferential series of perforations for the guidance of a corresponding number of balls 61. These balls are normally urged by a spring 65 into contact with the interior frusto-conical surface of a wedge ring 62, which is held in position by means of a gland nut 63 and which serves to support a stop washer 64 co-operating with a circumferential flange formed upon the sleeve 60. It will be seen that any tendency to move the rod 52 to the right will be counteracted by the wedging of the balls of the left hand locking means, while a similar tendency acting towards the left will be prevented from moving the rod 52 by means of the locking balls at the right hand end of the motor cylinder 50. When, however, the rod 52 is to be moved hydraulically by the operating lever 25, pressure fluid entering say the left hand working space 58 first presses up slightly the auxiliary cup washer 59, thus moving the sleeve 60 and disengaging the balls 61 through the ring 62. Excess hydraulic pressure thereafter acts upon the piston 53, thus moving the rod 52 to the right. When the requisite movement has been made the spring 65 once more locks the balls 61 against the ring 62.

In order that the position of the piston element 14 can be occasionally adjusted with respect to the position of the rod 52, a breathing master valve control is provided comprising a push button 66 in the cover 11 of the reservoir 10 as shown in Figure 4, said button 66 being formed at the lower end of its stem with a pointed end 67 adapted to engage a hole 68 in the radial arm 28. The push button 66 is normally protected by a cap 69, but when the latter is removed and said push button is depressed, the transverse member 26 can be held stationary, thus rendering the operating means for valves 37 temporarily ineffective, while the positions of the pistons 14 and operating lever 25 are suitably adjusted without forcing liquid into the pipe lines.

It will be appreciated that the invention can be carried into effect in a number of ways other than the one illustrated, and in some instances the piston or pistons of either the controlling element or the controlled element can be stationary, the cylinders being arranged to move, while any convenient form of operating means can be used for actuating the master cylinder unit or equivalent. Further, in the case of double acting systems the breathing valve arrangement can be so constructed that one valve only is caused to close, said valve, of course, corresponding to the master cylinder working space which is being called upon to eject liquid under pressure. Thus, as shown in Figure 5, lugs 27a and 28a may be removably mounted on arms 27 and 28 respectively so that upon removal of one of said lugs only one of the breathing valves will be caused to close—the one corresponding to the valve which should be allowed to close under the conditions prevailing.

What I claim is:—

1. A master cylinder unit for a liquid pressure remote control system, comprising a cylinder, a connection therefrom to a pipe line, a piston in said cylinder, operating means for said piston, a reservoir, a breathing valve device between the pipe connection and the reservoir, and frictional driving means mechanically connecting the breathing valve with the operating means whereby the breathing valve is closed by the initial movement of the operating means and remains closed throughout any unidirectional movement thereof, but is automatically opened whenever the operator lets go of said operating means.

2. A master cylinder unit for a liquid pressure remote control system, comprising a cylinder, a connection therefrom to a pipe line, a piston in said cylinder, operating means for said piston, a reservoir, a breathing valve device, influenced to close, between the pipe connection and the reservoir, and frictional driving means mechanically controlling the breathing valve from the operating means, whereby the breathing valve is permitted to close during the initial movement of the operating means and remains closed throughout any unidirectional movement thereof, but is automatically opened whenever the operator lets go of said operating means.

3. A master cylinder unit for a liquid pressure remote control system, comprising a cylinder, a connection therefrom to a pipe line, a piston in said cylinder, operating means for said piston, a lost motion device connecting the piston with the operating means, a reservoir, a breathing valve device between the pipe line connection and the reservoir, and frictional driving means mechanically connecting the breathing valve with the operating means whereby the breathing valve is closed by the initial movement of the operating means and remains closed throughout any unidirectional movement thereof, but is automatically opened whenever the operator lets go of said operating means.

4. A master cylinder unit for a liquid pressure remote control system, comprising a reservoir, a pair of opposed master cylinders carried by said reservoir, a double-acting piston member operating in said cylinders, an arm engaging the mid-portion of said piston member with lost motion, a handle for operating the arm, a pair of breathing valves adapted to connect the interior of the corresponding master cylinder with the reservoir, and a cam member in frictional engagement with the handle, said cam member being spring-influenced to assume a normal position in which it maintains the valves open, and to follow the initial movement of the handle so that during said initial movement at least one of the breathing valves closes during the time that said lost motion is being taken up.

5. A master cylinder unit for a liquid pressure remote control system, comprising a cylinder, a connection therefrom to a pipe line, a piston in said cylinder, operating means for said piston, a reservoir, a breathing valve device between the pipe connection and the reservoir, an intermediate member frictionally driven by the operating means and serving to connect said operating means mechanically with the breathing valve, whereby the breathing valve is closed by the initial movement of the operating means and remains closed throughout any unidirectional movement thereof, but is automatically opened whenever the operator lets go of said operating means, and a breathing valve master control device arranged to render the breathing valve operating means temporarily ineffective, thereby enabling the piston of the master cylinder unit to be moved for purposes of adjustment without forcing liquid into the pipe line.

6. A master cylinder unit as claimed in claim 4, in which the mid-portion of the piston member is formed with a slot, and in which the arm is fitted at its extremity with a roller engaging in said slot with an amount of axial play sufficient to permit the breathing valves to close before the roller engages the end of the slot at the commencement of any movement of the operating means.

7. A master cylinder unit for a liquid pressure remote control system, comprising a cylinder, a connection therefrom to a pipe line, a piston in said cylinder, operating means for said piston, a reservoir, a by-pass valve device between the pipe connection and the reservoir, an intermediate member frictionally driven by the operating means and serving to connect said operating means mechanically with the by-pass valve, whereby the by-pass valve is closed by the initial movement of the operating means and remains closed throughout any unidirectional movement thereof, but is automatically opened whenever the operator lets go of said operating means, a by-pass over-ruling device arranged to render the by-pass valve operating means temporarily ineffective, thereby enabling the piston of the master cylinder unit to be moved for adjustment purposes without forcing liquid into the pipe line, and means engageable with said intermediate member in its normal inoperative position to prevent movement thereof during the initial movement of the operating means.

8. A master cylinder unit for a liquid pressure remote control system, comprising a cylinder, a connection therefrom to a pipe line, a piston in said cylinder, operating means for said piston, a reservoir, a by-pass valve device between the pipe connection and the reservoir, an intermediate member frictionally driven by the operating means and serving to connect said operating means mechanically with the by-pass valve, whereby the by-pass valve is closed by the initial movement of the operating means and remains closed throughout any unidirectional movement thereof, but is automatically opened whenever the operator lets go of said operating means, a by-pass over-ruling device arranged to render the by-pass valve operating means temporarily ineffective, thereby enabling the piston of the master cylinder unit to be moved for adjustment purposes without forcing liquid into the pipe line, said over-ruling device comprising a plunger engageable with said intermediate member to completely prevent movement of the latter.

9. A master cylinder unit for a liquid pressure remote control system, comprising a cylinder, connections therefrom to two pipe lines, a double-acting piston in said cylinder for feeding liquid to either one pipe line or the other, operating means for said piston, a reservoir, breathing valves between the pipe line connections and the reservoir, and a mechanical connection between the valves and the operating means whereby the breathing valves are closed throughout any uni-directional movement of the operating means but are automatically opened whenever the operator lets go of said operating means, the said mechanical connection comprising a cam member frictionally moved by the operating means, a valve releasing rocker lever co-operating with the cam member at one end and controlling one of the breathing valves at its other end, a stop for limiting the movement of the rocker lever and consequently that of the cam member, and a spring urging the rocker lever into contact with the cam member.

10. A master cylinder unit for a liquid pressure remote control system, comprising a cylinder having a piston therein and a connection therefrom to a pipe line, a reservoir, a breathing valve device between the pipe line connection and the reservoir, and operating means for said piston, said operating means comprising a member acting upon said piston to move the latter through any desired part of its complete stroke and then hold it at the desired position intermediate the stroke limits, and also comprising a second member operating upon said breathing valve device to control opening and closing thereof independently of any change in the position of said piston, whereby the breathing valve may be opened even though the piston remains at said desired intermediate position.

11. A master cylinder unit as claimed in claim 10, in which the member operating upon the breathing valve comprises a cam element frictionally moved by the operating means, a valve releasing rocker lever co-operating with the cam element at one end and controlling the breathing valve at its other end, a stop for limiting the movement of the rocker lever and consequently that of the cam element, and a spring urging the rocker lever into contact with the cam element.

EDWARD CLAUDE
SHAKESPEARE CLENCH.